United States Patent [19]

Mejdell et al.

[11] 4,297,483
[45] Oct. 27, 1981

[54] PROCESS FOR REDUCING THE VINYL CHLORIDE CONTENT OF AQUEOUS DISPERSIONS OF VINYL CHLORIDE POLYMERS

[75] Inventors: Glor T. Mejdell; Odd E. Palmgren; Arne Talmoen; Bjarne Vik, all of Porsgrunn, Norway

[73] Assignee: Norsk Hydro a.s, Norway

[21] Appl. No.: 105,740

[22] Filed: Dec. 19, 1979

Related U.S. Application Data

[63] Continuation-in-part of Ser. No. 891,116, Mar. 28, 1978, abandoned.

[51] Int. Cl.$^3$ .......................... C08F 6/00; C08F 14/06
[52] U.S. Cl. .................................. 528/500; 422/243; 526/344; 528/502
[58] Field of Search ................ 528/500, 502; 260/29.6 PT

[56] References Cited

U.S. PATENT DOCUMENTS 3,926,927  12/1975  Stookey .................... 159/46 C
4,148,990   4/1979  Kuxdorf .................... 528/500
4,171,427  10/1979  Ohorodnik ................ 528/500

FOREIGN PATENT DOCUMENTS 853176  8/1977  Belgium ........................ 528/500
2521780 11/1976  Fed. Rep. of Germany ...... 528/500

Primary Examiner—C. A. Henderson
Attorney, Agent, or Firm—Wenderoth, Lind & Ponack

[57] ABSTRACT

The present invention relates to a process for the reduction of the vinyl chloride content of aqueous dispersions of vinyl chloride polymers and copolymers by countercurrent stripping with steam in a perforated plate column, by (1) adjusting the amount of steam introduced at the bottom of the column in such relation to the perforated area of an individual plate that the pressure drop across one plate gives a steam space between two adjacent plates of not more than 50 mm in height, such that the steam space is established just underneath the upper perforated plate and whereby the liquid layer is maintained above the lower perforated plate, and the liquid by bubbling steam therethrough, flushes the wall (surfaces) of the column in the steam space and said perforated plates to become clear of polymer particles; (2) the amount of dispersion fed to the top of the column and the amount of outgoing, stripped dispersion are adjusted in such relation to each other that at any time, the liquid layer is maintained well above the downcomer of the uppermost perforated plate; and (3) above the liquid level and the level at which the dispersion is fed, a liquid is introduced which continuously or discontinuously flushes the wall of the column.

2 Claims, 3 Drawing Figures

PROCESS FOR REDUCING THE VINYL CHLORIDE CONTENT OF AQUEOUS DISPERSIONS OF VINYL CHLORIDE POLYMERS

This application is a continuation-in-part of application Ser. No. 891,116 filed Mar. 28, 1978, now abandoned.

BACKGROUND AND PRIOR ART

Polyvinyl chloride is produced in large quantities throughout the world. The generally used production process is based on the polymerization of vinyl chloride in aqueous suspension or emulsion. In order to achieve optimum product quality the polymerization is conveniently discontinued at a conversion degrees of 90 to 95% of added vinyl chloride. Thus, when the polymerization is finished, significant amounts of unreacted vinyl chloride are present in the reaction vessel (the autoclave). A substantial proportion of said amounts is eliminated by pressure release in the autoclave and recycled to the process. Significant amounts of vinyl chloride, however, remain absorbed in the produced polymer particles. In the further processing of the polymer into powder, in particular during the drying operation, part of said absorbed vinyl chloride escapes, whereas another part remains in the polymer particles and accompanies the product all the way to the manufacturer of the final product where, due to the relatively high processing temperatures being employed, risks are present that the said absorbed residual amounts of vinyl chloride will be set free.

Recently, scientific investigations have shown that vinyl chloride may cause cancer in the liver. Particularly, this applies to persons who for longer time periods have been working in polyvinyl chloride production plants. In most countries, therefore, rather strict requirements have now been set to the working environments in such factories, said requirements being directed to the content of vinyl chloride in the production room and to the amounts of vinyl chloride ventilated to the free air, as well as to the amount of vinyl chloride in the final polymer. These new requirements involve, i.a., that the vinyl chloride content of the finished polymer has to be lowered to a level which was previously regarded as unattainable.

As stated above, a significant proportion of the unreacted vinyl chloride is eliminated and recirculated by pressure release in the reaction vessel itself, and by increasing the temperature during this operation one has already succeeded in eliminating substantially more vinyl chloride than what has previously been the case. However, polyvinyl chloride has a limited heat stability, and by longer residence times at higher temperatures, degradation and, accordingly, a reduction of the product quality will result. Thus, this restricts the possibilities available of increasing the stripping of vinyl chloride at higher temperatures.

It is known to reduce the vinyl chloride content of polyvinyl chloride dispersions by stripping with steam, preferably at reduced pressures in order to reduce the hazard of thermal degradation of the polymer. This operation may be carried out in the polymerization vessel itself, directly after the polymerization has been finished, or in a separate stripping unit. Due to the strict requirements now set to the monomer content of the finished polymer, one must use higher temperatures during the stripping process than the temperature of about 70° C. which has up to now been considered to be an upper limit. By batchwise stripping, one will have a relatively long heating period and cooling period which implies that polymers are subject to an undesirably strong thermal stress. When stripping continuously, it will be of advantage to operate with more stripping units arranged in series because the residence time distribution of the particles can thereby be restricted, and a longer mean residence time can be used without any significant degradation of the polymer.

Instead of stripping units connected in series it has also been proposed to use a multistage stripping column which operates according to the counter-current principle with feeding of the polyvinyl chloride dispersion on the top and steam at the bottom of the column. The stripping column may be designed in different known ways, and columns with filling bodies as well as perforated plate columns may be used.

Both columns present the great disadvantage of polymer particles being deposited. In columns with filling bodies this deposition takes place on and between the filling bodies, whereas in a perforated plate column, the deposition takes place along the walls above the liquid layer on each plate. This deposition occurs in the conventional operation for counter-current perforated plate columns having separate layers of liquid above each plate, because relatively great amounts of steam have to be used, which in turn causes a splashing of dispersion on the wall of the column such that polymer particles remain adhered when the dispersion flows back. Foaming also contributes to such deposition of polymer particles.

Such a deposition of particles causes the operation of the column to be discontinued, or else large amounts of polymer might be degraded by being exposed to excessively high temperatures for longer time periods. The hazard of contamination of the final product is thereby great.

It is therefore an object of this invention to avoid the foregoing disadvantages, particularly the avoidance of the above-discussed deposition of particles and subsequent degradation thereof.

BRIEF SUMMARY OF THE INVENTION

The present invention relates to a process of stripping polyvinyl chloride dispersions in perforated plate columns counter-currently with steam, said process not being burdened with the above stated disadvantages.

The process of the invention is characterized by the following features: (1) the amount of steam introduced at the bottom of the column is adjusted in such relation to the hole area of an individual plate that the pressure drop across one plate gives a steam space between two adjacent perforated plates of not more than 50 mm in height, such that the steam space is established just underneath the upper perforated plate and whereby the liquid layer is maintained above the lower perforated plate, and the liquid by bubbling steam therethrough, flushes the wall (surfaces) of the column in the steam space and said perforated plates to become clear of polymer particles; (2) the amount of dispersion fed to the top of the column and the amount of outgoing, stripped dispersion are adjusted in such relation to each other that at any time, the liquid layer is maintained well above the downcomer of the uppermost perforated plate; and (3) above the liquid level and the level at which the dispersion is fed, a liquid is introduced which continuously or discontinuously flushes the wall of the column.

In said so-called liquid-filled perforated plate column, the passage of liquid and steam, preferably, takes place through the holes of the plates. However, in addition, also downcomers may be provided on each plate. As the flushing liquid, water from any available source may be used, it being preferred, however, to condense outgoing steam from the column and utilize this as the flushing liquid. Also the liquid from outgoing, stripped polymer dispersion can be used for this purpose after the polymer particles have been removed (through settling).

According to feature (1) of the process mentioned above, the ratio between the steam amount and the hole area per plate shall be adjusted such that the pressure drop across one plate gives a steam space between two adjacent perforated plates of not more than 50 mm. Although, in order to avoid the settling of particles on the plates, a relatively large hole area per plate has to be selected in order to obtain sufficient agitation, this process will permit stripping at low steam amounts, whereby the expenses connected with steam are reduced, since the amount of steam condensate will be low. The stated upper limit of the steam space lies per se far lower than what is the case in the conventional operation of perforated plate columns. As is also apparent from the stated examples for practising the present invention, it is possible to operate with steam space heights down to below 1 mm. As known, the height of the steam space may, however, be subject to variations during the operation of a column, but, in any case, it must lie below the stated upper limit.

DETAILED DESCRIPTION OF THE INVENTION

The invention will now be described more in detail under reference to the accompanying drawings, wherein FIGS. 1 & 2 serve to show the process by means of columns of two different embodiments.

Figure 1:
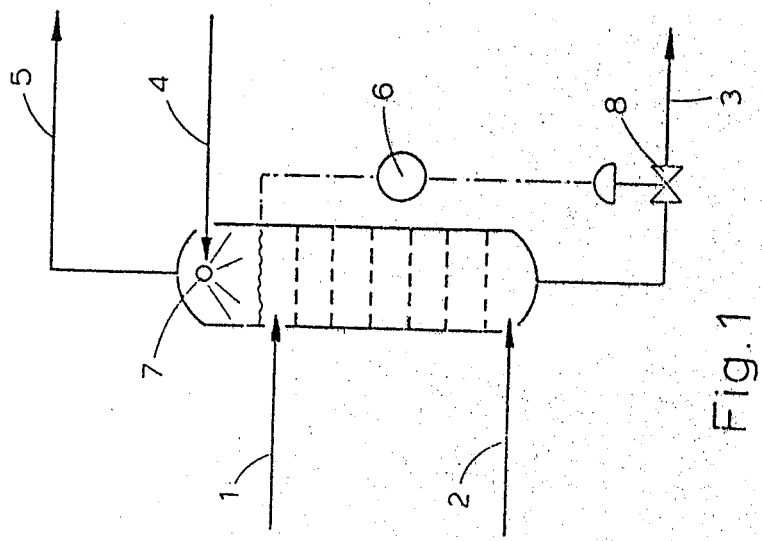
FIG. 1 schematically depicts a vertical cross-section of the apparatus for carrying out the process of the present invention.

In FIG. 1, the dispersion to be stripped is passed through conduit 1 to the top of the column, whereas steam is introduced at the bottom through conduit 2. Stripped dispersion leaves the column through conduit 3. Through conduit 4 flushing liquid is introduced at the top of the column and is brought to flush the walls of the column through the spraying nozzle 7. Water vapor containing stripped vinyl chloride leaves the column through the conduit 5. An automatic level controlling device 6 which is connected to a control valve 8 for outgoing, stripped polymer dispersion provides for the maintenance of a constant liquid level above the uppermost plate.

Figure 2:
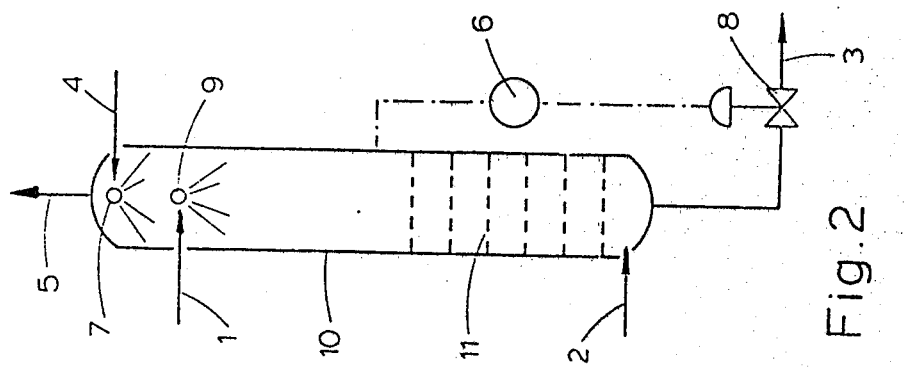
FIG. 2 schematically depicts a vertical cross-section of another embodiment of such apparatus.

FIG. 2 shows a column which is divided into two sections wherein 10 designates the spraying tower section, whereas the lower part 11 is the perforated plate section. In its upper part the spraying section is provided with two spraying nozzles 7 and 9, of which the upper one 7, as already mentioned, distributes the flushing liquid over the wall of the column, whereas the lower one, 9, provides for the distribution of entering dispersion over the cross section of the spraying tower. The remaining reference numbers in FIG. 2 correspond to what has already been mentioned in connection with FIG. 1. A reiteration is considered superfluous, since these details are not characteristic features of the invention.

Figure 3:
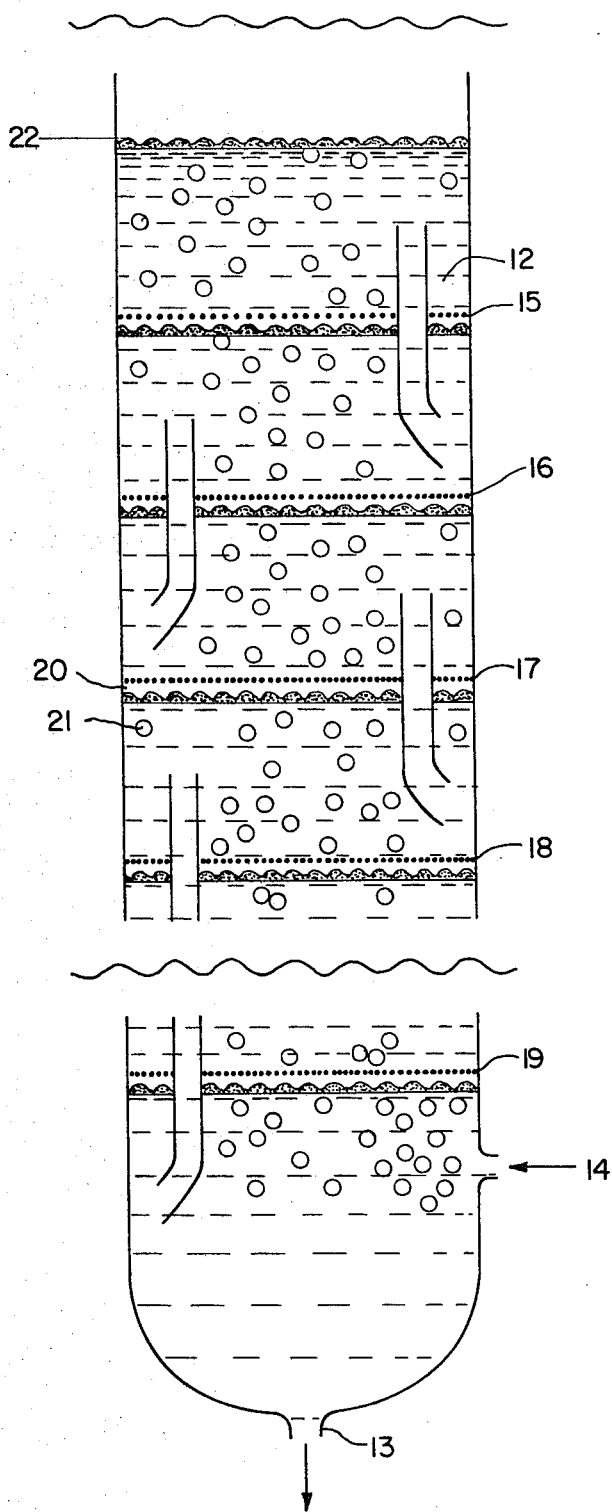
FIG. 3 schematically depicts a vertical cross-section (partially broken) of the column of the present invention in operation.

FIG. 3 shows schematically a vertical section (partially broken) of the column. From FIG. 3 it will be seen that the volume comprising the perforated plates is essentially filled by a continuous fluid phase with suspended vapor bubbles.

The column is filled up with water and then the liquid on the top plate is kept at a constant level (top level control 22) well above the downcomer 12 on the uppermost plate, by controlled liquid (slurry) outlet 13 at the bottom of the column.

Then the steam inlet 14 at the bottom of the column is adjusted so that the dynamic pressure drop by passage of steam through each of plates 15 to 19 is less than 50 mm of water preferably less than 15 mm, corresponding to an equally small vapor pocket 20 underneath each plate.

This situation is maintained when switching the feed from water to polymer slurry.

As an essential part of the full scale stripping column in the production of PVC there are provided electrodes (not shown) for conductivity measurements 15 mm below each plate or every second plate. The electrical indicators tell whether there is liquid contact at these positions.

The preferred condition is partial liquid contact which is estimated to correspond to a vapor phase underneath each plate of less than 15 mm.

By pilot plant operation using glass equipment it can be observed visually a polymer build-up underneath the plates when the height of the vapor pockets exceeds 15 to 25 mm. Some fluctuations of short duration with vapor pockets of up to 50 mm can be tolerated without operational instability.

In the following Examples 2 and 3 the process of the invention shall be further elucidated. Example 1 is included for comparison and demonstrates the conventional way of carrying out the stripping operation in counter-current perforated plate columns.

In the Examples, the stated amount of remaining vinyl chloride has been calculated on the basis of the amount of polymer present.

EXAMPLE 1

A stripping column of 75 mm internal diameter was used in this experiment. The column was equipped with four perforated plates with overflow. There were 5 holes each of 3 mm D per plate. The plate distance was 250 mm. The overflow height was 75 mm.

Preheated suspension was pumped in on the top of the column. The suspension contained 25% by weight of polyvinyl chloride having a mean particle size of about 100 microns, a specific surface area of 1.5 m$^2$ per gram, determined by nitrogen adsorption, and a K value of 68. The vinyl chloride content of the suspension was 1100 ppm.

About 60 grams of steam per minute was fed to the bottom of the column, corresponding to a pressure drop across one plate of about 100 mm of water. The column was operated in conventional manner with a liquid layer on each plate determined by the overflow height.

The pressure in the upper part of the apparatus was 365 mm Hg, corresponding to a boiling temperature of 80° C. From the bottom of the column was pumped out a suspension containing 70 ppm of vinyl chloride after a residence time of about 3 minutes. The load on the column was thereafter reduced such that the residence time was increased to about 4.5 minutes. This provided a vinyl chloride content in the suspension of 40 ppm.

Above the liquid layer on each plate there was a foam phase of at least 50 mm. The liquid splashed up against the wall and against the plate located above during the boiling process, and at these sites polymer particles were gradually deposited. This deposition of polymer below the plates increased gradually up to about 10 mm of thickness with only a narrow passage below each hole for the ascending steam flow. Along the wall of the column above each liquid layer the deposition had a thickness of 2 to 3 mm. The experiment had to be discontinued after 30 minutes of operation.

EXAMPLE 2

For this experiment a column assembly was employed as shown in FIG. 1. The column had an inner diameter of 75 mm and was equipped with 6 perforated plates having a mutual distance of 300 mm. There were 10 holes, each of 3 mm D, per plate.

Preheated polymer dispersion of the same kind and the same vinyl chloride content as used in Example 1 was pumped in through the conduit 1 and a liquid layer of 300 mm was established above the uppermost plate. This liquid layer was maintained during the whole experiment by automatically controlling the amount of outgoing, stripped suspension by means of the level controller 6 and the exit valve 8 connected therewith.

To the bottom of the column 10 grams of steam per minute were introduced through conduit 2. The steam amount relative to the hole area of the plates gave a pressure drop across one plate which corresponded to a steam space between two adjacent perforated plates of about 0.5 mm. After approximately 10 minutes of operation, hot water in a rate of about 10 grams per minute was forced continuously through the spraying nozzle 7 by means of a pressure pump (not shown on the drawing) via the conduit 4 such that the upper walls of the column were subjected to constant flushing. The pressure in the upper part of the column was 530 mm Hg, corresponding to a boiling temperature of 90° C. The first part of the experiment was carried out with a residence time of the suspension of 3 minutes, 2.5 liters per minute of stripped suspension being discharged containing 200 ppm of vinyl chloride.

In the latter half of the experiment the load on the column was reduced such that the residence time was increased to 7 minutes, whereupon one liter per minute of completely stripped suspension containing 30 ppm of vinyl chloride was discharged.

During the operation of the column no problems arose and no deposition of polymer particles could be observed. There was only a slight foaming.

EXAMPLE 3

For this experiment a column was employed as shown in FIG. 2, viz., the upper part designed as a spraying tower 10. The dimensions of the column, the number of plates and holes per plate as well as the pressure and temperature were as stated in Example 2. The same kind of suspension was used as in the previous examples, with the exception that the vinyl chloride content was 5000 ppm. The liquid layer above the upper plate was 300 mm. The spraying nozzle 9 for the suspension feed was placed 1.60 meters above the upper plate and the spraying nozzle 7 for the flushing liquid was placed about 300 mm above the spraying nozzle 9. As flushing liquid for this experiment was used condensed steam from the column.

Preheated suspension containing 5000 ppm of vinyl chloride was pumped into the column through the spraying nozzle 9, and steam in a rate of 10 grams per minute was introduced to the bottom of the column through the conduit 2.

The first half of the experiment was carried out with a residence time of 4 minutes, and there was discharged an amount of stripped dispersion of 2 liters per minute containing 100 ppm of vinyl chloride. The load on the column was then reduced such that the residence time was increased to 9 minutes, which corresponds to an amount of outgoing, stripped suspension of 0.9 liters per minute. The vinyl chloride content was 10 ppm.

In order to demonstrate the effect of the spraying tower it may be mentioned that at the highest load on the column (first part of the experiment) more than half the vinyl chloride (3000 ppm of the original amount of 5000 ppm) was removed in the spraying tower whereas in the second part of the experiment with a lower load, the removal of 3800 ppm of the original vinyl chloride content of the suspension was obtained.

The operation of the column went without any problems, and no deposition of polymer particles nor any foaming could be detected.

COMPARATIVE EXAMPLE

German Pat. No. 25 21 780 (Hoechst) employs a column equipped with sieve plates. The polymer dispersion is introduced into the upper part of the column and is treated in counter-current with water vapor. However, the patent does not specify anything about control of liquid level in the column. By studying the examples given in the specification, it can be shown that the column contains two different phases: On top of each plate a liquid layer with suspended bubbles, and above that and underneath each plate, a vapor phase containing entrained liquid droplets or foam.

The liquid level on the plates can be estimated from the feed rate and retention times given in Example 1 in the cited patent:
Feed rate: 48 liters/hour
Retention time: 1 minute
Column diameter: 100 mm
No. of perforated plates: 20

This corresponds to 5 mm of slurry on each plate, or only 3 to 4% of the space between the plates (150 mm) being filled with liquid phase.

Further, the pressure drop of 50 to 80 Torr across the column of 20 plates is equivalent to a differential pressure of 30 to 50 mm liquid height (density approximately 1.1 $g/cm^3$) per plate. Thus, even if one disregards the dynamic pressure drop through the perforated plates, this means that with a plate distance of 150 mm, less than 20 to 30% of the space between plates can be filled with suspension.

In the column employed in the present process, which is essentially filled with liquid, approximately the same superficial steam velocity as in the Hoechst column (130 to 250 $kg/cm^2$, h) is used. According to measurements at the cited steam load, approximately 75% of the volume between plates consisted of liquid (and hence, 25% being suspended bubbles and vapor phase). Compared to the estimated 3 to 4% liquid (20 to 30%) typical for the Hoechst column, it should be evident that the present process is essentially different from the Hoechst process.

We claim:

1. In a process for the reduction of the vinyl chloride content of aqueous dispersions of vinyl chloride polymers and copolymers after completion of polymerization and after pressure release and preceding removal of thereby released vinyl chloride, by counter-current stripping with steam in a perforated plate column, the plates of which are equipped with downcomers, the improvement wherein the amount of steam introduced at the bottom of the column is adjusted in such relation to the hole area of an individual plate that the pressure drop across one plate gives a steam space between two adjacent perforated plates of not more than 50 mm in height such that the steam space is established just underneath the upper perforated plate and whereby the liquid layer is maintained above the lower perforated plate, and the liquid by bubbling steam therethrough, flushes the wall surfaces of the column in the steam space and said perforated plates to become clear of polymer particles, and further that the amount of dispersion fed to the top of the column and the amount of outgoing, stripped dispersion and adjusted in such relation to each other, that at any time, the liquid layer is maintained substantially above the downcomer of the uppermost perforated plate, and that above the liquid level and the level at which the dispersion is fed, a liquid is introduced which continuously or discontinuously flushes the wall of the column.

2. The process according to claim 1 wherein the liquid volume is maintained at about 75% of the total volume between the plates.

* * * * *